(12) United States Patent
Aron

(10) Patent No.: US 6,293,450 B1
(45) Date of Patent: Sep. 25, 2001

(54) QUICK RELEASE MECHANISM FOR MOTORCYCLE SADDLEBAG

(76) Inventor: Mathew R. Aron, 4555 Fanuel St., San Diego, CA (US) 92109

( * ) Notice: Subject to any disclaimer, the term of this patent is extended or adjusted under 35 U.S.C. 154(b) by 0 days.

(21) Appl. No.: 09/502,895

(22) Filed: Feb. 10, 2000

(51) Int. Cl.$^7$ .................................. B62J 7/04; B62J 9/00
(52) U.S. Cl. ...................... 224/430; 224/413; 224/429; 224/431; 224/547
(58) Field of Search .................... 224/413, 429, 224/430, 431, 547, 271; 403/361, 378; D12/407, 408, 409, 410; 280/228.4, 304.3

(56) References Cited

U.S. PATENT DOCUMENTS

| | | | |
|---|---|---|---|
| 2,553,739 | * 5/1951 | Ashdowne | 224/430 X |
| 2,577,560 | * 12/1951 | Ashdowne | 224/413 X |
| 2,783,927 | * 3/1957 | Harley | 224/430 |
| 3,346,156 | * 10/1967 | Jones | 224/413 |
| 3,390,897 | * 7/1968 | Moore | 403/361 X |
| 4,096,980 | * 6/1978 | Clow | 224/413 X |
| 4,163,513 | * 8/1979 | Kramer | 224/429 X |
| 4,274,181 | * 6/1981 | Schaller | 224/271 X |
| 4,295,586 | * 10/1981 | Shockley | 224/430 |
| 5,176,465 | * 1/1993 | Holsted | 403/361 X |
| 5,379,912 | * 1/1995 | Wolf | 220/481 |
| 5,762,249 | * 6/1998 | Hann | 224/430 |
| 6,053,384 | * 4/2000 | Bachman | 224/413 X |

FOREIGN PATENT DOCUMENTS

477010 A  * 3/1992 (EP) .................... 224/32 A

* cited by examiner

Primary Examiner—Gregory M. Vidovich
(74) Attorney, Agent, or Firm—Brown, Martin, Haller & McClain LLP

(57) ABSTRACT

A quick-release mounting system for a motorcycle saddlebag and a method for retrofitting a motorcycle with the system. The system includes two or more couplings with which one can retrofit a motorcycle by replacing each bolt of the original mounting system with one of the couplings. Each coupling includes a first coupling portion and a second coupling portion that can be removably coupled and uncoupled with one another in a quick-release manner.

3 Claims, 2 Drawing Sheets

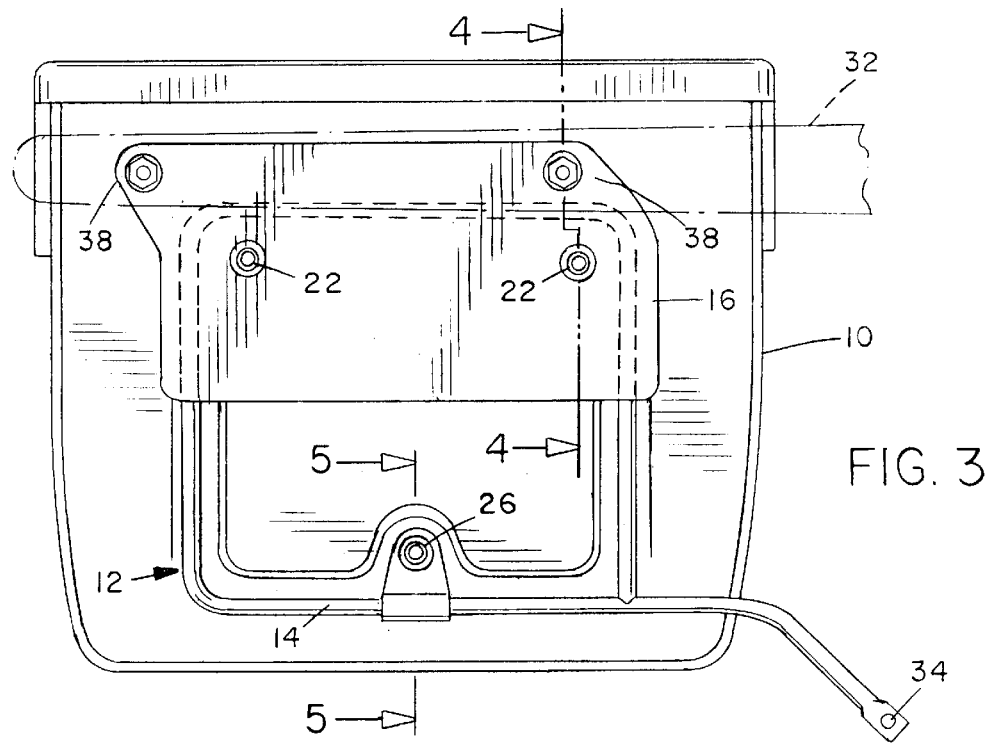
FIG. 3
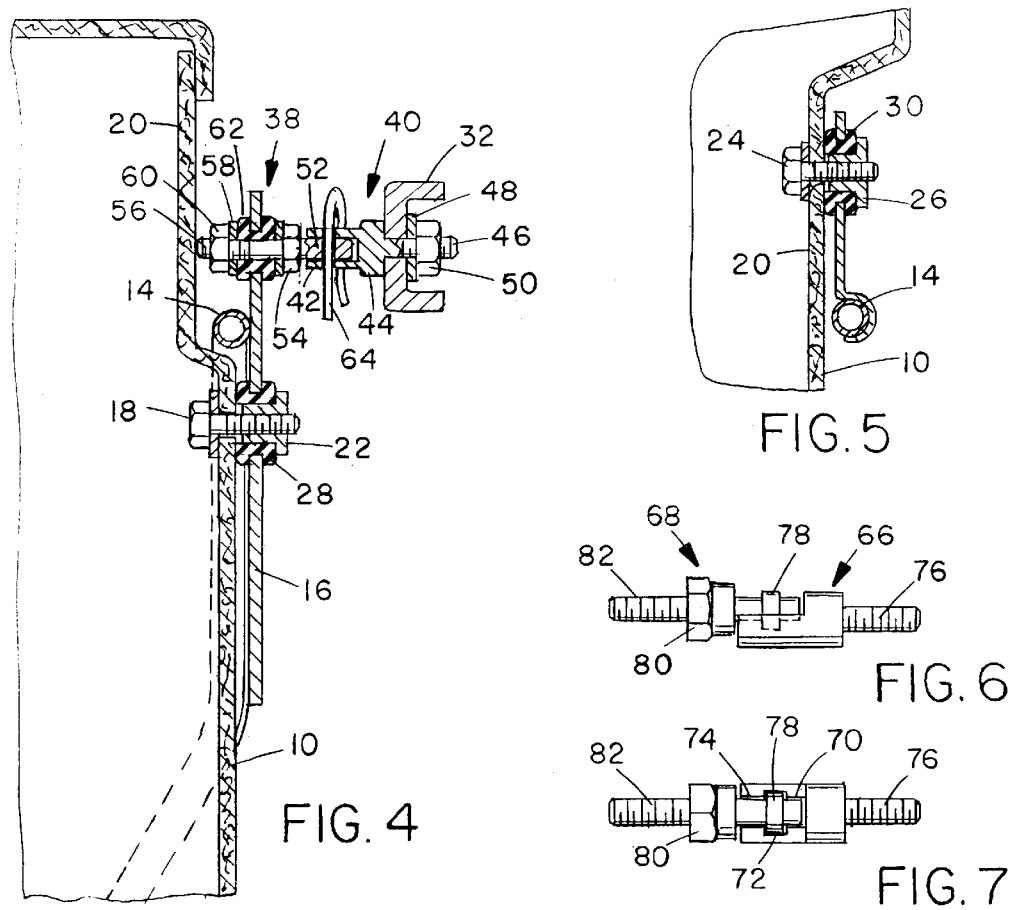
FIG. 4
FIG. 5
FIG. 6
FIG. 7

QUICK RELEASE MECHANISM FOR MOTORCYCLE SADDLEBAG

BACKGROUND OF THE INVENTION

1. Field of the Invention

The present invention relates generally to saddlebags and, more specifically, to motorcycle saddlebags.

2. Description of the Related Art

A motorcycle may have saddlebags for carrying the riders personal gear, repair tools or other items. One saddlebag is typically mounted to a bracket attached to the frame rearward of the rider's seat on each side of the motorcycle.

Although many saddlebags are made of leather, others are made of fiberglass or a similar rigid material.

Saddlebags generally must be removed to perform any significant maintenance on the motorcycle. Removing a saddlebag may be inconvenient and time consuming because the saddlebag is often bolted to the mounting bracket, which in turn is bolted to the frame of the motorcycle. For example, to remove each saddlebag from the HARLEY-DAVIDSON HERITAGE ® motorcycle, one must unscrew four bolts to detach the saddlebag from the mounting bracket and unscrew three bolts to detach the mounting bracket from the frame. The bolts that attach the bracket to the frame are typically received in internally threaded cylindrical studs that abut the frame and have a threaded shank that extends through a hole in the frame and is secured to the frame with a nut.

Mounting mechanisms that promote removability of motorcycle saddlebags have been developed. Most of these mechanisms are intended by their manufacturers to be retrofitted to the original saddlebags, i.e., the saddlebags normally provided by the motorcycle manufacturer as part of the motorcycle. One such mechanism includes a bracket having several protrusions or clips, each with a U-shaped slot. The mechanism further includes a corresponding number of studs that replace the existing or original studs. Each stud has a groove that receives the edges of the U-shaped slot of the corresponding clip when the bracket is mounted on the motorcycle. Each clip has a set screw that can be used to secure the clip on the stud. To remove a saddlebag, one loosens the set screw and lifts the saddlebag until the clips disengage the studs. Another such mechanism includes saddlebags that are intended to replace the original saddlebags. The mechanism also includes studs. When the saddlebag is mounted on the motorcycle, each stud extends through a hole in the saddlebag and is retained by a spring clip inside the saddlebag. To remove the saddlebag, one must reach inside the saddlebag, remove the spring clip from each stud, and lift the bag off the studs. A disadvantage of this design is that such parts protruding into the saddlebag can catch on items stored there. It may also be cumbersome to reach into the saddlebag to access the spring clip. Other mechanisms have been included in motorcycles by the original equipment manufacturer (i.e., the motorcycle manufacturer) to mount fiberglass or similar hard-sided saddlebags in a removable manner. One such mechanism includes a so-called "aircraft pin," which is a removable pin that extends through a hole in the saddlebag and is received in a spring clip mounted to the frame. To remove the saddlebag, one must reach inside to remove the pin.

It would be desirable to provide a motorcycle saddlebag release mechanism that is quick and easy to use and that does not include parts that protrude into the interior of the saddlebag. These problems and deficiencies are clearly felt in the art and are solved by the present invention in the manner described below.

SUMMARY OF THE INVENTION

The present invention relates to a quick-release mounting system for a motorcycle saddlebag and a method for retrofitting a motorcycle with the system. The system includes two or more couplings with which one can retrofit a motorcycle by replacing each bolt of the original mounting system with one of the couplings. Each coupling comprises a first coupling portion and a second coupling portion that can be removably coupled and uncoupled with one another in a quick-release manner.

To retrofit the motorcycle with the system, one first removes each bolt and corresponding nut that secures the saddlebag assembly to the motorcycle frame. One then inserts the threaded shank of each second coupling portion through one of the holes in the frame that formerly received a bolt and secures it with a nut. Then, one inserts the threaded shank of the first coupling portion through one of the mounting openings in the saddlebag assembly and secures it with a nut. The saddlebag can then be reattached to the motorcycle by mating each of the first coupling portions with one of the second coupling portions.

In accordance with one embodiment of the present invention, each coupling comprises a first coupling portion, a second coupling portion, and a pin. The first coupling portion has a threaded shank extending along an axis, a socket extending coaxially from the shank, and a pin hole extending transversely through the socket with respect to said axis. The second coupling portion has a threaded shank extending along an axis, a plug extending coaxially from the shank and coaxially mateable with the socket of the first coupling portion, and a pin hole extending transversely through the plug with respect to the axis. The pin is extendable simultaneously through the pin hole of the first coupling portion and the pinhole of the second coupling portion when said plug is mated with the socket.

To attach the saddlebag assembly, one orients the saddlebag assembly such that the plug of each second coupling portion is coaxially aligned with the socket of one of the first coupling portions. One then moves the saddlebag closer to the motorcycle until each plug is fully inserted in one of the sockets and the pin holes of the first and second coupling portions are aligned. A pin is then inserted through the aligned pin holes to retain the coupling portions together. The saddlebag can be removed by reversing these steps.

In accordance with another embodiment of the present invention, each coupling comprises a first coupling portion having a slot and a second coupling portion having an enlarged bolt head with a shape corresponding to that the slot. The first coupling portion has a threaded shank extending along an axis and a has a body extending from said shank. The slot, which is generally elongated in shape, is located in a sidewall of the body. The slot has an enlarged head area closer to said threaded shank than a remaining tail area of the slot that is axially more distant from the threaded shank. The second coupling portion has a threaded shank extending along an axis and has a retaining bolt that is transversely mateable with the slot of the first coupling portion by engaging the bolt head in the slot from a direction transverse to the axis of the first coupling portion.

To attach the saddlebag assembly, one orients the saddlebag assembly such that each second coupling portion is adjacent to each first coupling portion and their axes are parallel with one another. For example, the saddlebag assembly may be held such that each second coupling portion is slightly above each first coupling portion. One can then lower the saddlebag until the bolt head of each second coupling portion is fully received in the slot of one of the first coupling portions. The saddlebag assembly does not tend to slip off of the motorcycle because the enlarged head is captured in the slot. The saddlebag assembly can be removed by reversing these steps.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 3 is a rear view of the saddlebag assembly;

FIG. 4 is an enlarged sectional view taken on line 4—4 of FIG. 3;

FIG. 5 is an enlarged sectional view taken on line 5—5 of FIG. 3;

FIG. 6 is a side view of an alternative coupling; and

FIG. 7 is a top view of an alternative coupling.

DESCRIPTION OF PREFERRED EMBODIMENTS

Figure 1:
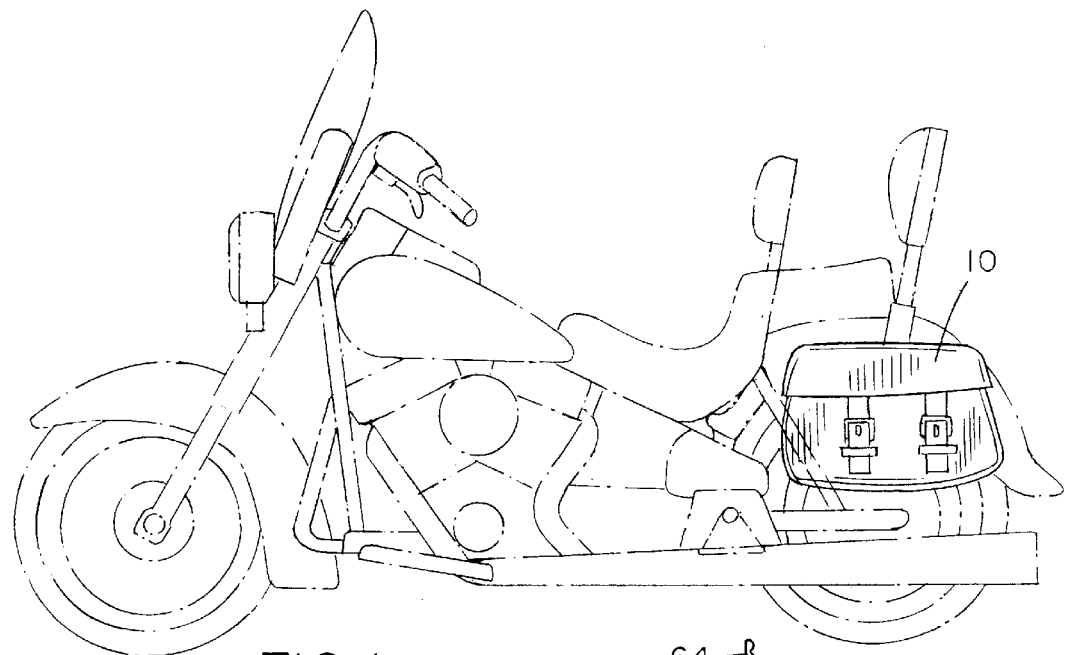
FIG. 1 is a side view showing a saddlebag mounted on a motorcycle, which is shown in broken line.
Figure 2:
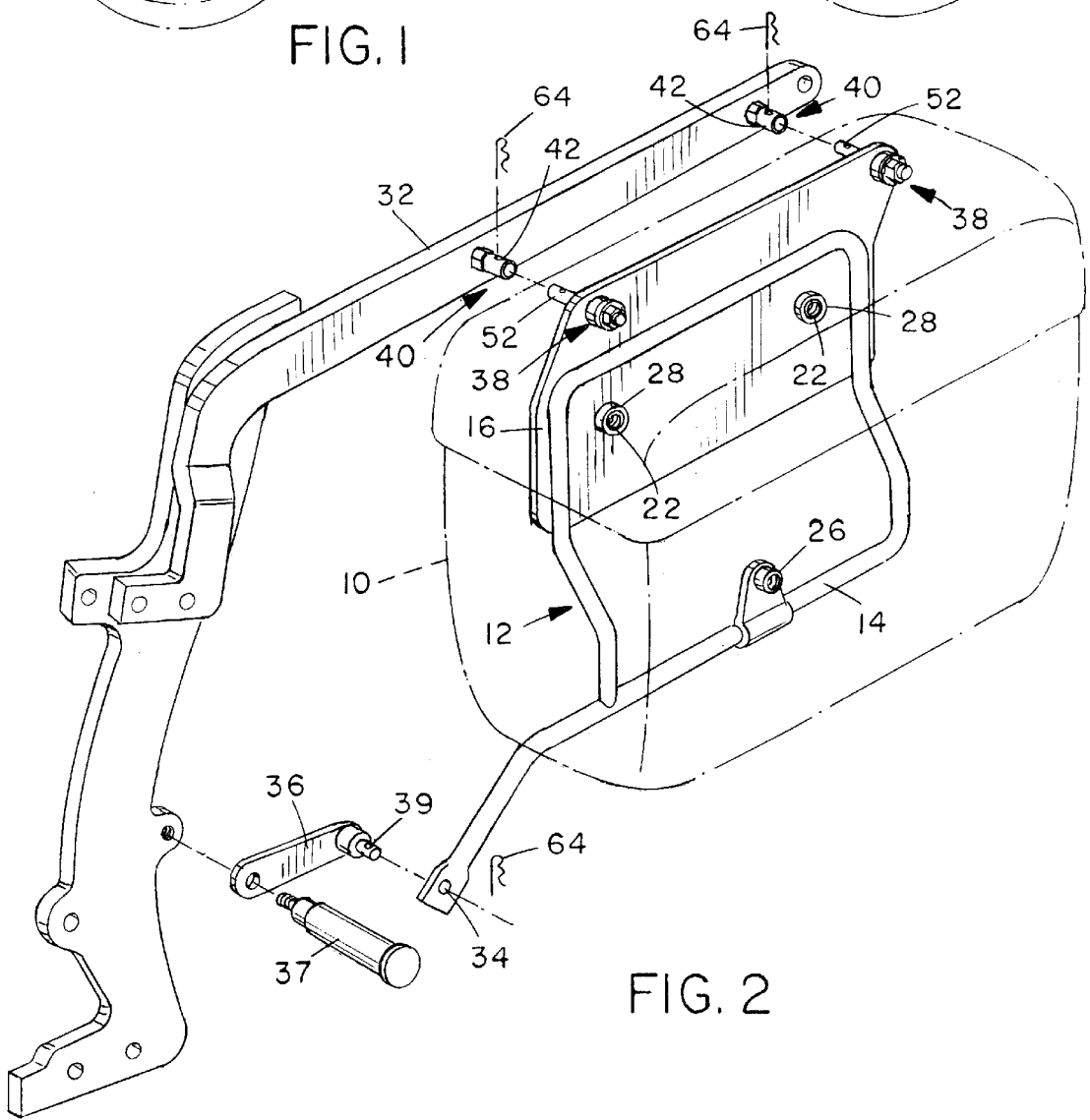
FIG. 2 is an exploded view of a saddlebag assembly, showing the mounting mechanisms of the present invention.

As illustrated in FIG. 1, a saddlebag assembly 10 is mounted on a motorcycle (shown in phantom line). As illustrated in FIG. 2, saddlebag assembly 10 includes a saddlebag (shown in phantom line) and a mounting bracket 12. A portion 14 of mounting bracket 12 is tubular and a portion 16 is plate-like. As illustrated in FIGS. 4 and 5, the saddlebag is attached to mounting bracket 12 by two bolts 18 that extend through holes in the inboard side of the saddlebag wall 20 and are received in two threaded studs 22 in plate-like portion 16 and by one bolt 24 that extends through another hole in the inboard side of saddlebag wall 20 and is received in the threaded stud 26 on tubular portion 14. Grommets 28 and 30 in these holes damp any vibration. Saddlebag assembly 10 is attached, more or less permanently, to a fender brace portion of the frame 32 of the motorcycle by two bolts (not shown) that extend through a pair of holes in plate-like portion 16 and frame 32 and by a third bolt (not shown) that extends through a hole 34 in tubular portion 14. Specifically, the former two bolts are screwed into internally threaded studs (not shown), which have threaded shanks that are in turn secured to the fender brace portion of frame 32 by nuts (not shown) in the conventional manner. The latter or third bolt extends not only through hole 34 but also through a hole in bracket extension 36 and is secured to by a nut. Bracket extension 36 is in turn bolted to frame 32, typically by a foot peg 37. The above-described structure is well-known in the art, as it exists in the HARLEY-DAVIDSON HERITAGE® motorcycle. Prior to retrofitting the motorcycle in accordance with the present invention, the only way to remove saddlebag assembly 10 is to remove the three bolts that secure it to frame 32.

To retrofit the motorcycle in accordance with the present invention, one removes the bolts, studs, and nuts that, as described above, secure saddlebag assembly 10 to frame 32. As illustrated in FIG. 2, two or more of the bolts and their corresponding studs or nuts are each replaced with a quick-release coupling of the present invention. For example, in place of each of the two bolts that formerly secured plate-like portion 16 of bracket 12, a second coupling portion 38 is attached to plate-like portion 16. In place of each of the two studs that were formerly secured to fender brace portion of frame 32, a first coupling portion 40 is attached. In place of the third bolt, which was formerly attached to bracket extension 36 and secured tubular portion 14 to bracket extension 36, a a coupling member 39 similar to second coupling portion 38 is attached to bracket extension 36. Each first coupling portion 40 is removably mateable in a quick-release manner with each second coupling portion 38.

The structure of each coupling and the manner in which it is attached is illustrated in further detail in FIG. 4. Each first coupling portion 40 has a cylindrical socket 42, a bolt head 44, and a threaded shank 46. In FIG. 4, shank 46 extends through one of the holes in the fender brace portion of frame 32 and is secured by a washer 48 and a nut 50. Coupling member 39, shown in FIG. 2, which attaches tubular portion 14 to bracket extension 36, has a similar structure and is mounted in essentially the same manner. That is, it has a threaded shank (not shown) that extends through the hole in bracket extension 36 and is secured by another washer 48 and nut 50 (not shown in FIG. 2). It further has an enlarged cylindrical elastomeric bushing that abuts bracket extension 36 to damp vibration. Returning to FIG. 4, each second coupling portion 38 has a cylindrical plug 52, a bolt head 54, and a threaded shank 56. Shank 56 extends through one of the holes in plate-like portion 16 of bracket 12 and is secured by a washer 58 and nut 60. The original elastomeric grommet 62 remains in the hole to damp vibration.

Plug 52 and socket 42 have pin holes (see FIG. 1) or bores extending transversely with respect to their longitudinal axes. First coupling portion 40 and second coupling portion 38 of each coupling are mated by inserting plug 52 coaxially into socket 42 until the pin holes of each are aligned with one another. A retaining pin 64 of the type commonly referred to as a hairpin cotter is inserted through both pin holes to lock first coupling portion 40 and second coupling portion 38 together. With reference to FIG. 2, a plug portion of coupling member 39 that is similar to plug 52 is inserted through hole 34 in tubular portion 14 of bracket 12 and similarly secured by pin 64.

To remove saddlebag assembly 10 from the motorcycle, one can quickly and easily remove each pin 64 and separate saddlebag 10 from the motorcycle such that each plug 52 is withdrawn from its mating socket 42. No tools are necessary to assist one in removing saddlebag assembly 10.

An alternative coupling is illustrated in FIGS. 6 and 7. As in the embodiment described above, each coupling has a first coupling portion 66 and a second coupling potion 68. First coupling portion 66 has a generally elongated slot 70 with a semi-cylindrical head area 72 that has diameter greater than that of a semi-cylindrical tail area 74 of slot 70. First coupling portion 66 further has a threaded shank 76. Second coupling portion 68 has a substantially cylindrical retaining bolt with an enlarged cylindrical head 78 that fits within head area 72 of first coupling portion 66. Second coupling portion 68 further has bolt head 80 and a threaded shank 82. Although in this embodiment the shapes of the mating parts are cylindrical, in other embodiments the mating parts may have other suitable shapes.

As described above with respect to the embodiment illustrated in FIGS. 24, first coupling portion 66 is mounted by extending shank 76 through one of the holes in the fender brace portion of frame 32 and securing it with a washer and nut (not shown). Second coupling portion 68 is mounted by extending shank 82 through one of the holes in plate-like portion 16 of bracket 12 and securing it with a washer and nut (not shown).

To mount saddlebag assembly 10 on the motorcycle using the alternative coupling, one orients saddlebag assembly 10 such that the retaining bolt of second coupling portion 68 is laterally adjacent to slot 70 of first coupling portion 66. Preferably, first coupling portion 66 is mounted on the motorcycle in an orientation in which slot 70 faces upwardly or vertically with respect to the ground. With that orientation, one can mount saddlebag assembly 10 by lowering it until the retaining bolt is fully received in slot 70. The retaining bolt rests in slot 70 and cannot easily be inadvertently uncoupled because enlarged head 78 cannot be withdrawn in an axial direction out of head area 72. Rather, to remove saddlebag assembly 10, out of slot 70. Tubular portion 14 of bracket 12 can be coupled to bracket extension 36 using the coupling described above with respect to FIGS. 2–4.

The present invention allows one to quickly and easily mount and dismount a motorcycle saddlebag without the use of tools and without reaching into the saddlebag. A motorcycle such as the HARLEY-DAVIDSON HERITAGE® can be retrofitted by replacing the original bolt system with the quick-release coupling system of the present invention. Although the present invention is particularly suitable for such retrofitting, it can alternatively be included as original equipment on a motorcycle.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A method for retrofitting an existing motorcycle saddlebag mounting mechanism with a quick-release mechanism, said existing motorcycle saddlebag mounting mechanism having a plurality of bolts extending through a corresponding number of mounting openings in a saddlebag assembly and secured in a corresponding number of holes in a motorcycle frame, the method comprising the steps of:

removing each bolt from one of said holes;

providing quick release couplings;

mounting a first portion of each coupling by securing a threaded shank of said first portion in one of said mounting openings in said saddlebag assembly;

mounting a second portion of each coupling by securing a threaded shank of said second portion in one of said holes in said motorcycle frame; and attaching said saddlebag to said motorcycle by mating each of said first portions with one of said second portions.

2. The method recited in claim 1, wherein:

said first portion of each said coupling comprising an axis extending along said threaded shank of said first portion, a socket extending coaxially from said threaded shank of said first portion, and a pin hole extending transversely through said socket with respect to said axis;

said second portion of each said coupling comprising an axis extending along said threaded shank of said second portion, a plug extending coaxially from said threaded shank of said second portion wherein said plug is coaxially mateable with said socket of said first portion, and a pin hole extending transversely through said plug with respect to said axis of said second portion, whereby;

said step of mating each of said first portions with a respective one of said second portions comprises inserting said plug into said socket and extending a pin simultaneously through said pin hole of said first coupling and said pinhole of said second coupling.

3. The method of claim 1, wherein:

said first portion of each said coupling comprising an axis extending along said threaded shank of said first portion and a body extending from said threaded shank of said first portion, said body having a sidewall with a generally elongated slot, said slot having an enlarged head area closer to said threaded shank than a remaining tail area of said slot which is axially more distant from said threaded shank of said first portion than said enlarged head area;

said second portion of each said coupling comprising an axis extending along said threaded shank of said second portion and a retaining bolt with an enlarged head corresponding in shape to said head area of said slot and a narrower tail corresponding in shape to said tail area of said slot; whereby said step of mating each of said first portions with a respective one of said second portions comprises engaging said retaining bolt in said slot from a directing transverse to said axis of said first coupling portion such that said head area of said slot receives said head of said retaining bolt and said tail area of said slot receives said tail of said retaining bolt.

* * * * *